US008649764B2

(12) United States Patent
Xie et al.

(10) Patent No.: US 8,649,764 B2
(45) Date of Patent: Feb. 11, 2014

(54) METHOD, MOBILE TERMINAL, SERVICE PLATFORM AND SYSTEM FOR IMPLEMENTING DEBIT CARD SERVICE

(75) Inventors: Fang Xie, Shenzhen (CN); Jianjun Yang, Shenzhen (CN); Sanping Zhang, Shenzhen (CN); Xuefeng Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/509,054

(22) PCT Filed: May 11, 2010

(86) PCT No.: PCT/CN2010/072591
§ 371 (c)(1),
(2), (4) Date: May 10, 2012

(87) PCT Pub. No.: WO2010/148796
PCT Pub. Date: Dec. 29, 2010

(65) Prior Publication Data
US 2012/0225637 A1 Sep. 6, 2012

(30) Foreign Application Priority Data
Nov. 23, 2009 (CN) .......................... 2009 1 0222639

(51) Int. Cl.
*H04M 1/66* (2006.01)
(52) U.S. Cl.
USPC ........ 455/410; 455/415; 455/414.1; 455/411; 379/114.2; 379/142.05; 379/210.01; 705/39
(58) Field of Classification Search
USPC ............. 455/406, 414.1, 432.2, 404.2, 404.1, 455/405, 410, 408, 426.1, 415, 411; 379/45, 114.14, 114.19, 114.2, 142.05, 379/210.01; 705/41, 39, 1.1
See application file for complete search history.

(56) References Cited

U.S. PATENT DOCUMENTS

| | | | |
|---|---|---|---|
| 6,038,309 A * | 3/2000 | Ram et al. ...................... | 379/229 |
| 6,643,362 B2 * | 11/2003 | Hogan et al. .................. | 379/196 |
| 2003/0061163 A1 * | 3/2003 | Durfield ......................... | 705/44 |
| 2003/0231753 A1 * | 12/2003 | Casaccia ................... | 379/207.02 |
| 2006/0126806 A1 * | 6/2006 | Trandal et al. .............. | 379/88.26 |
| 2006/0188084 A1 * | 8/2006 | Rogers et al. ............ | 379/265.01 |

(Continued)

OTHER PUBLICATIONS

International Search Report for PCT/CN2010/072591 dated Aug. 19, 2010.

*Primary Examiner* — Mahendra Patel
(74) *Attorney, Agent, or Firm* — Ling Wu; Stephen Yang; Ling and Yang Intellectual Property

(57) ABSTRACT

A method and system for implementing debit card service based on callback. The method is applied to a mobile terminal set with an automatic dialing function unit, automatic dialing function of the automatic dialing function unit is activated, and a number corresponding to the mobile terminal is bound with one debit card. The method includes the following steps: a preset callback access number is dialed before the called number by the automatic dialing function unit in the mobile terminal to connect the call to a debit card service platform when the mobile terminal calls the called number; the debit card service platform releases the call and calls back the mobile terminal; the called number is continued by the debit card service platform after the mobile terminal answers the callback; the debit card service based on callback is implemented.

11 Claims, 4 Drawing Sheets

(56) References Cited

U.S. PATENT DOCUMENTS

2007/0201646 A1* 8/2007 Metcalf .................. 379/142.01
2008/0097924 A1* 4/2008 Carper et al. .................. 705/65
2008/0205615 A1* 8/2008 Kim et al. ................ 379/142.04

* cited by examiner

METHOD, MOBILE TERMINAL, SERVICE PLATFORM AND SYSTEM FOR IMPLEMENTING DEBIT CARD SERVICE

TECHNICAL FIELD

The present invention relates to the communication field, and in particular, to a method for implementing debit card service based on callback, a mobile terminal, service platform and system for implementing the method.

BACKGROUND OF THE RELATED ART

The debit card service is mainly aiming at the ordinary personal user. It allows the service user to call out on any telephone set but need not pay in cash at once, which only records the expense at specified account number and makes the user call conveniently and need not worry about paying in cash.

The present debit card service is mainly aiming at the fixed terminal user, but it is very difficult to popularize the debit card service in the mobile terminal user. One important reason is that, to the mobile terminal user, there is a secondary charging problem when using the ordinary debit card service. The user inputs the debit card service access code on the mobile terminal, and then under the prompt of the system, inputs the account number, the password and the called number, and the service platform (application server) system continues the calling according to the input called number. In this process, the mobile terminal user, as the calling party, not only needs to pay the conversation expense on the debit card, but also needs to pay the conversation expense of dialing the debit card access code to the mobile operator. Since there is the secondary charging problem, it is very difficult to popularize the debit card service in the mobile terminal user.

In order to solve the secondary charging problem, the present conventional solution is to adopt a callback method. The mobile terminal user dials one specific debit card callback assess code, and the call is triggered to the service platform, then the service platform releases the call and calls back the calling terminal, and then prompt the user to input the debit card account number, the password and the called number. In this process, the user must remember the specific debit card callback access code, and after dialing that access code, the service platform will release the call at once, and then the calling number is called back. Since the operation is comparatively cumbersome and the user experience is unfriendly, the application of that method is very limited.

In addition, there is a callback method based on hardware, that is, utilizing the auto mobile dialer card, the user presses the auto mobile dialer card against the SIM card, and installs into the mobile phone together. In the configuration interface of the auto mobile dialer, the user can configure the access code of the callback service, and can activate or shut down the auto dial function; if activating the auto dial function, it can use the callback service according to the ordinary mobile phone use habit; if shutting down the auto dial function, it uses as the ordinary mobile phone.

The above-mentioned two kinds of callback methods need to be realized through different service platforms, and for the operator, establishing the service platform for different users respectively costs too much.

SUMMARY OF THE INVENTION

The technical problem that the present invention requires to solve is to provide a method for implementing debit card service based on callback, a mobile terminal, service platform and system for implementing the method, which overcomes the secondary charging problem and improves the user experience.

In order to solve the above-mentioned problem, the present invention provides a method for implementing debit card service based on callback, applying to a mobile terminal set with an automatic dialing function unit, wherein, automatic dialing function of the automatic dialing function unit is activated, and a number corresponding to the mobile terminal is bound with one debit card, and the method comprises:

the automatic dialing function unit in the mobile terminal dialing a preset callback access code before a called number when the mobile terminal calls the called number, and triggering a call to a debit card service platform;

the debit card service platform releasing the call and calling back the mobile terminal;

the debit card service platform continuing the called number after the mobile terminal answers the callback; and therefore, implementing the debit card service based on the callback.

In the method, the automatic dialing function unit is realized through a hardware mode, or realized through an application program mode or through a firmware mode.

In the method, the callback access code is preset in the automatic dialing function unit, the preset callback access code in the automatic dialing function unit realized through the hardware mode, the preset callback access code in the automatic dialing function unit realized through the application program mode and the preset callback access code in the automatic dialing function unit realized through the firmware mode are different.

The method further comprises: the debit card service platform performing traffic statistics to the debit card service realized through the hardware mode, the application program mode or the firmware mode respectively.

The method further comprises: after the debit card service platform calls back the mobile terminal, judging whether a calling number corresponding to the mobile terminal has already finished binding with the debit card, and if already finished the binding, then continuing the called number; if not finished the binding, then prompting the mobile terminal to finish binding with the debit card.

In the method, the debit card is bound with a plurality of numbers, and the automatic dialing function unit in the mobile terminal corresponding to the plurality of the numbers uses same or different realization mode.

In order to solve the above-mentioned problem, the present invention provides a system for implementing debit card service, comprising a debit card service platform, and a mobile terminal containing an automatic dialing function unit, wherein, automatic dialing function of the automatic dialing function unit is activated, and a number corresponding to the mobile terminal is bound with one debit card, wherein:

the mobile terminal containing the automatic dialing function unit is configured to that: the automatic dialing function unit in the mobile terminal dials a preset callback access code before a called number when the mobile terminal calls the called number, and triggers the call to the debit card service platform;

the debit card service platform is configured to release the call and call back the mobile terminal initiating the call after receiving the call of dialing the preset callback access code; continue the called number in the call after the mobile terminal answers the callback; and therefore, implement the debit card service based on the callback.

In the system, the automatic dialing function unit is realized through a hardware mode, or realized through an application program mode or through a firmware mode.

In order to solve the above-mentioned problem, the present invention provides a mobile terminal for implementing debit card service, comprising an automatic dialing function unit and a calling unit, wherein:

the calling unit is configured to: initiate a call to a called number after the called number is input by a user;

the automatic dialing function unit comprises a state module, a setting module and a dialing module, wherein, the state module is configured to store state information of automatic dialing function of the automatic dialing function unit, and the state information is expressed as an activated state or a non-activated state;

the setting module is configured to store with a callback access code of the debit card service platform; and the dialing module is configured to, when the state information stored by the state module expresses the automatic dialing function in the activated state and when the calling unit initiates the call to the called number, dial the callback access code stored by the setting module before the called number and trigger the call to the debit card service platform.

In the mobile terminal, a number corresponding to the mobile terminal is bound with one debit card, the debit card is used by one or more mobile terminals, when being used by a plurality of mobile terminals, the automatic dialing function of the plurality of mobile terminals uses same or different realization mode.

In order to solve the above-mentioned problem, the present invention provides a debit card service platform for implementing debit card service, comprising a receiving module, a call releasing module, a callback module and a conversation establishment module, wherein:

the receiving module is configured to receive a call of dialing a preset callback access code initiated by the mobile terminal containing an automatic dialing function unit, and the number of the call comprises the callback access code and a called number;

the call releasing module is configured to release the call after the receiving module receives the call;

the callback module is configured to call back the mobile terminal after the call releasing module releases the call; and the conversation establishment module is configured to continue the called number in the call after the mobile terminal answers the callback.

The debit card service platform further comprises a binding judgment module, configured to judge whether a number corresponding to the mobile terminal has already finished binding with the debit card, and if already finished the binding, then trigger the conversation establishment module to continue the called number; if not finished the binding, then prompt the mobile terminal to finish binding with the debit card.

The debit card service platform further comprises a bill generation module, configured to generate a bill after the conversation of the mobile terminal and the called party ends, record the expense of the conversation and deduct from the debit card.

In the debit card service platform, the automatic dialing function unit in the mobile terminal is realized through the hardware mode, or realized through the application program mode or through the firmware mode; and the receiving module is further configured to store with a callback access code used by the mobile terminal realizing the automatic dialing function through the hardware mode, the application program mode and the firmware mode, and the call the receiving module received comprises a call initiated by the mobile terminal realizing the automatic dialing function through the hardware mode, a call initiated by the mobile terminal realizing the automatic dialing function through the application program mode and a call initiated by the mobile terminal realizing the automatic dialing function through the firmware mode.

In the debit card service platform, the bill generation module is further configured to perform traffic statistics to the debit card service realized on the basis of the hardware mode, the application program mode or the firmware mode respectively according to difference of the callback access code.

The debit card service platform of the present invention is especially designed for the mobile user, which can analyze the called number dialed by the user, and finish continuing the called party automatically, and establish the conversation between the calling party and the called party. In addition, since the callback is initiated voluntarily, it can avoid the mobile user to generate the expense, and deducts the telephone expense only from the account number bound by the user in advance.

The mobile phone application program of the present invention makes the user, when using the debit card service, operate more simply and more convenient, and the user experience is better.

PREFERRED EMBODIMENTS OF THE PRESENT INVENTION

Figure 1:
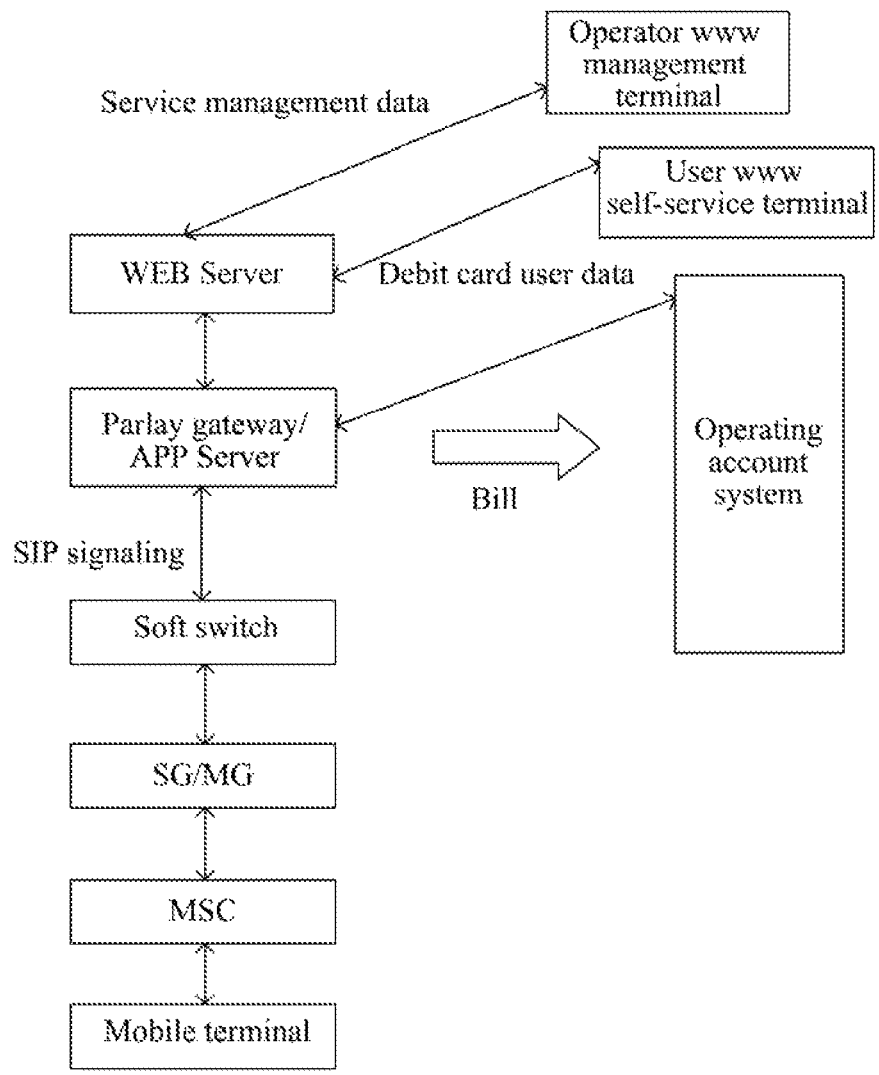
FIG. 1 is a reference diagram of structure of a system of the present invention.

Aiming at the shortcoming of the callback scheme in the market at present, in order to improve the user experience and overcome the secondary charging problem, the present invention puts forward a kind of new callback scheme, so that the callback debit card service platform can support two modes at the same time, not only support the callback mode based on the hardware, but also support the callback mode based on the software.

The technical scheme of the present invention adopts the following technical scheme: the method is applied to a mobile terminal set with an automatic dialing function unit, wherein, automatic dialing function of the automatic dialing function unit is activated, and a number corresponding to the mobile terminal is bound with one debit card, and the method includes:

the automatic dialing function unit in the mobile terminal dialing a preset callback access code before a called number when the mobile terminal calls the called number, and triggering a call to a debit card service platform;

the debit card service platform releasing the call and calling back the mobile terminal;

the debit card service platform continuing the called number after the mobile terminal answers the callback; and therefore, implementing the debit card service based on the callback.

Preferably, the automatic dialing function unit is realized through a hardware mode, or realized through an application program mode or through a firmware mode.

The debit card can be bound with a plurality of numbers, that is, one debit card can be shared by a plurality of users, and the automatic dialing function unit in the mobile terminal corresponding to the plurality of the numbers uses same or different realization mode.

The callback assess code is preset in the automatic dialing function unit, the preset callback access code in the automatic dialing function unit realized through the hardware mode, the preset callback access code in the automatic dialing function unit realized through the application program mode and the preset callback access code in the automatic dialing function unit realized through the firmware mode are different. This way, the debit card service platform performing traffic statistics to the debit card service realized through the hardware mode, the application program mode or the firmware mode respectively. Or different rates are used to perform the charging according to different modes.

(1), in the mode based on the hardware, that is, utilizing the auto mobile dialer card, the user presses the auto mobile dialer card against the SIM card, and installs them into the mobile phone together. In the configuration interface of the auto mobile dialer, the user can configure the ACCESS code of the callback service, and then can activate or shut down the auto dial function; if activating the auto dial function, it can use the callback service according to the ordinary mobile phone use habit; if shutting down the auto dial function, it uses the call function as the ordinary mobile phone.

(2), in the mode based on the software, through the soft auto dialer software based on the mobile phone provided by the present invention, the mobile phone user downloads that software and installs it, the soft auto dialer software already initializes the Access code of the callback service, and the user can also reconfigure that access code. The user runs the soft mobile dialer through the mobile phone, and can select to activate or shut down the auto dial function; and if activating the auto dial function, it can use the callback service according to use habit of the ordinary mobile phone; if shutting down the auto dial function, it uses the call function as the ordinary mobile phone.

The debit card service triggered after the mobile terminal realizing the automatic dialing function through the hardware mode initiates the call is the debit card service realized based on the hardware mode; the debit card service triggered after the mobile terminal realizing the automatic dialing function through the application program mode initiates the call is the debit card service realized based on the application program mode; and the debit card service triggered after the mobile terminal realizing the automatic dialing function through the firmware mode initiates the call is the debit card service realized based on the firmware mode.

No matter the user adopts which of the above-mentioned mode to initiate the call, the callback debit card service platform all can support it. The debit card service platform of the present invention is especially designed for the mobile user, is able to analyze the called number dialed out by the user, and to complete continuing the called party automatically, and to establish the conversation between the calling party and the called party. In addition, since the callback is initiated voluntarily, it can avoid generating the expense to the mobile user, and only deduct the telephone expense from the account number with which the user binds in advance.

The system for implementing the above-mentioned debit card service includes a debit card service platform, and a mobile terminal containing an automatic dialing function unit, wherein, automatic dialing function of the automatic dialing function unit is activated, and a number corresponding to the mobile terminal is bound with one debit card, wherein:

the mobile terminal containing the automatic dialing function unit is configured to that: the automatic dialing function unit in the mobile terminal dials a preset callback access code before a called number when the mobile terminal calls the called number, and triggers the call to the debit card service platform;

the debit card service platform is configured to: release the call and call back the mobile terminal initiating the call after receiving the call of dialing the preset callback access code; continue the called number in the call after the mobile terminal answers the callback; and therefore, implement the debit card service based on the callback.

The mobile terminal for implementing the above-mentioned debit card service includes an automatic dialing function unit and a calling unit, wherein:

the calling unit is configured to: initiate a call to a called number after the called number is input by a user;

the automatic dialing function unit includes a state module, a setting module and a dialing module, wherein, the state module is configured to store state information of automatic dialing function of the automatic dialing function unit, and the state information is expressed as an activated state or a non-activated state;

the setting module is configured to store with a callback access code of the debit card service platform; and the dialing module is configured to, when the state information stored by the state module expresses the automatic dialing function in the activated state and when the calling unit initiates a call to the called number, dial the callback access code stored by the setting module before the called number and trigger the call to the debit card service platform.

Figure 2:
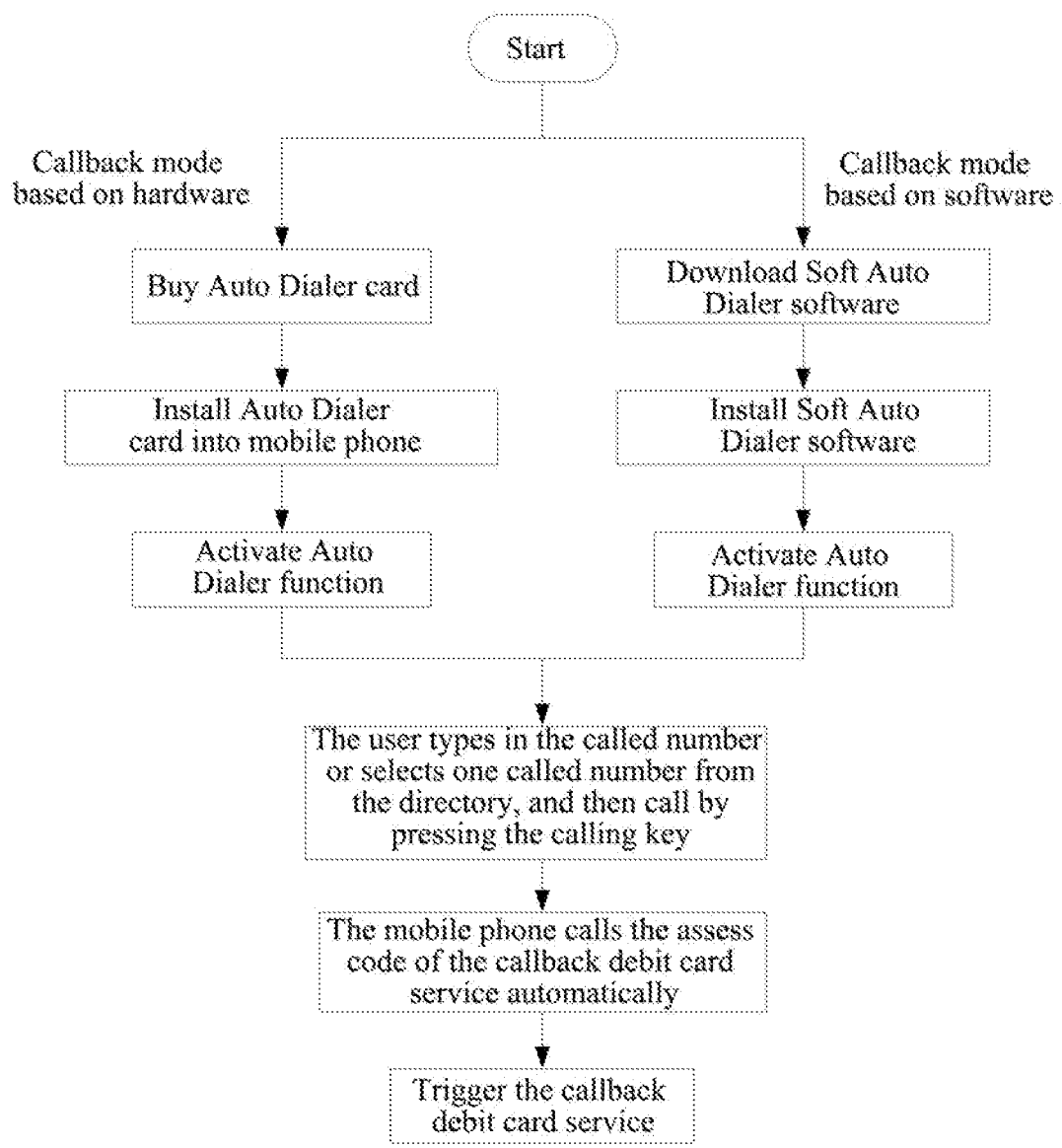
FIG. 2 is a schematic diagram of a process of a user using two kinds of callback modes of the present invention.

The automatic dialing function unit described here is an application program installed in the mobile terminal (that is, the soft auto dialer software in FIG. 2).

The number corresponding to the mobile terminal is bound with one debit card, the debit card is used by one or more mobile terminals, when being used by a plurality of mobile terminals, the automatic dialing function of the plurality of mobile terminals uses same or different realization mode.

The debit card service platform for implementing the above-mentioned debit card service includes a receiving module, a call releasing module, a callback module and a conversation establishment module, wherein:

the receiving module is configured to receive a call of dialing a preset callback access code initiated by the mobile terminal containing an automatic dialing function unit, wherein, the number of the call comprises the callback access code and a called number;

the call releasing module is configured to release the call after the receiving module receives the call;

the callback module is configured to call back the mobile terminal after the call releasing module releases the call; and the conversation establishment module is configured to continue the called number in the call after the mobile terminal answers the callback.

Preferably, the debit card service platform further includes a binding judgment module, configured to judge whether a number corresponding to the mobile terminal has already finished binding with the debit card, and if already finished the binding, then trigger the conversation establishment module to continue the called number; if not finished the binding, then prompt the mobile terminal to finish binding with the debit card.

Preferably, the debit card service platform further includes a bill generation module, configured to generate a bill after the conversation between the mobile terminal and the called party ends, record the expense of the conversation and deduct from the debit card.

Preferably, the automatic dialing function unit in the mobile terminal is realized through the hardware mode, or realized through the application program mode or through the firmware mode; and the receiving module is further configured to store with a callback access code used by the mobile terminal realizing the automatic dialing function through the hardware mode, the application program mode and the firmware mode, and the call of the receiving module comprises a call initiated by the mobile terminal realizing the automatic dialing function through the hardware mode, a call initiated by the mobile terminal realizing the automatic dialing function through the application program mode and a call initiated by the mobile terminal realizing the automatic dialing function through the firmware mode.

Preferably, the bill generation module is further configured to perform traffic statistics to the debit card service realized on the basis of the hardware mode, the application program mode or the firmware mode respectively according to difference of the callback access code.

The implementation of the technical scheme of the present invention is described in detail combining the accompanying drawings and specific embodiments hereinafter.

As shown in FIG. 1, the system for implementing debit card service based on callback of the embodiment of the present invention mainly includes the following devices/network elements, a WEB server provides the WEB service based on WWW, and the operator can access the WEB server to finish the service management through the WWW management terminal; the debit card user can access the WEB server to finish the self-service management function of the debit card service through the WWW self-service terminal; meanwhile, it can also support the self-service management based on the WEB and the user self-service management based on interactive voice response (IVR);

an operator www management terminal is provided, and the operator can perform the service management through the www terminal, including the functions such as, the issue, activation, inquiring and recharging of the debit card, and the traffic statistics of the debit card service, etc;

a user www self-service terminal is used to realize the self-service management based on the WEB for the user, and the user can perform the functions, such as, logging on the WEB websites, setting the default language, binding the number, modifying the password, inquiring the bill, inquiring the balance, inquiring the period of validity of the debit card, recharging, transferring accounts, etc.; alternatively, it can also realize the self-service management based on the IVR, and the user can enter the IVR self-service management procedure by dialing the debit card access code, and perform the functions, such as, setting the default language, binding the number, modifying the password, inquiring the balance, inquiring the period of validity of the debit card, recharging, transferring accounts, etc., through the voice interaction;

a Parlay (one exploration service development interface) gateway/APP (the service platform based on the Parlay interface) is used for the logical realization of the debit card service based on callback, and it transmits the bill to the operating account system at the same time;

a soft switch server is used for realizing the service call control and the connection control function, which is the core of the next generation network call and control. In the debit card service based on callback of the present embodiment, the soft switch receives the call request from the Parlay gateway, and continues the calling and called numbers;

a signaling gateway/media gateway (SG/MG) is provided, the MG is used for mapping or code conversion of the media among different networks; the SG is used for processing the communication flow of the signaling network, similar with the media gateway MG, and finishes the signaling control and coordination function among different signaling systems;

a mobile switching center (MSC) is provided, and the MSC is the core of the whole GSM network, and is used for providing the connection between the exchanging function and other functions in the system;

an operating account system is a comprehensive service platform providing the operation and account unified management and the resource sharing of the relevant service; in the debit card service based on callback, the operating account system receives the bill of the Parlay gateway/APP, and performs the relevant background process; and a mobile terminal, the mobile user uses the debit card service based on callback through the mobile terminal.

Wherein, at the service networking, the debit card service based on callback is loaded on the Parlay gateway/APP, the Parlay gateway connects with the soft switch server by using the session initial protocol (SIP). Wherein, the Parlay gateway and the APP server can usually be located on one device together.

Compared with the current system for implementing the debit card service, the key point of the system for implementing the debit card service based on the callback provided by the present embodiment is that the call of the debit card service based on the callback logic realized by the Parlay gateway/APP is initiated by the application side (that is, initiated from the Parlay gateway/APP), while the current debit card service is initiated from the network side (that is, initiated from the terminal side). In addition, the debit card service based on the callback provides two kinds of different callback modes: hardware mode and software mode, which are aiming at two kinds of different callback modes. the debit card service platform provides two different Access Codes respectively, and can provide relevant traffic statistics for the two kinds of callback modes respectively, and also different rates can be used for the two modes certainly. Wherein, no matter the hardware mode or the software mode, it is finished on the basis of the mobile terminal.

Referring to FIG. 2, the embodiment of the present invention provides a debit card service scheme based on callback, which supports the mobile terminal to use the debit card service based on the callback by adopting the two modes, on the basis of the hardware and on the basis of the software. Wherein, aiming at two different callback modes, the debit card service platform provides two different access codes respectively, and can provide relevant traffic statistics for two kinds of callback modes respectively.

As shown in FIG. 2, the procedure using two kinds of callback modes of the present embodiment includes:

(1), in the mode based on the hardware, that is, utilizing the auto mobile dialer card, the user presses the auto mobile dialer card against the SIM card, and installs them into the mobile phone together. In the configuration interface of the auto mobile dialer, the user can configure the access code of the callback service, and then can activate or shut down the auto dial function; if activating the auto dial function, it can use the callback service according to the use habit of ordinary mobile phone; if shutting down the auto dial function, it uses the call function as the ordinary mobile phone.

(2), in the mode based on the software, through developing the soft auto dialer software based on the mobile phone, the mobile phone user downloads that software and installs it, the soft auto dialer software has already initialized the access code of the callback service, so the user needs not to reconfigure it. The user runs the soft mobile dialer through the mobile phone, and can select to activate or shut down the auto dial function; and if activating the auto dial function, it can use the callback service according to the use habit of ordinary mobile phone; if shutting down the auto dial function, it uses the call function as the ordinary mobile phone.

In the above-mentioned modes based on the hardware and based on the software, if the user activates the auto dial function, then the user can use the callback service according to the use habit of ordinary mobile phone. When the user needs to initiate a call, the user, according to the use habit of past mobile phone, types in the called number at first or selects the called number in the telephone number, and then presses the calling key; at this moment, the mobile phone actually calls the access code of the callback debit card service automatically, instead of the called number; after that call is triggered to the debit card service platform, the debit card service platform releases the call, and then calls back that calling number; after the calling user answers the call, the debit card service platform continues the called number automatically at once, and establishes the conversation between the calling number and the called number.

Figure 3:
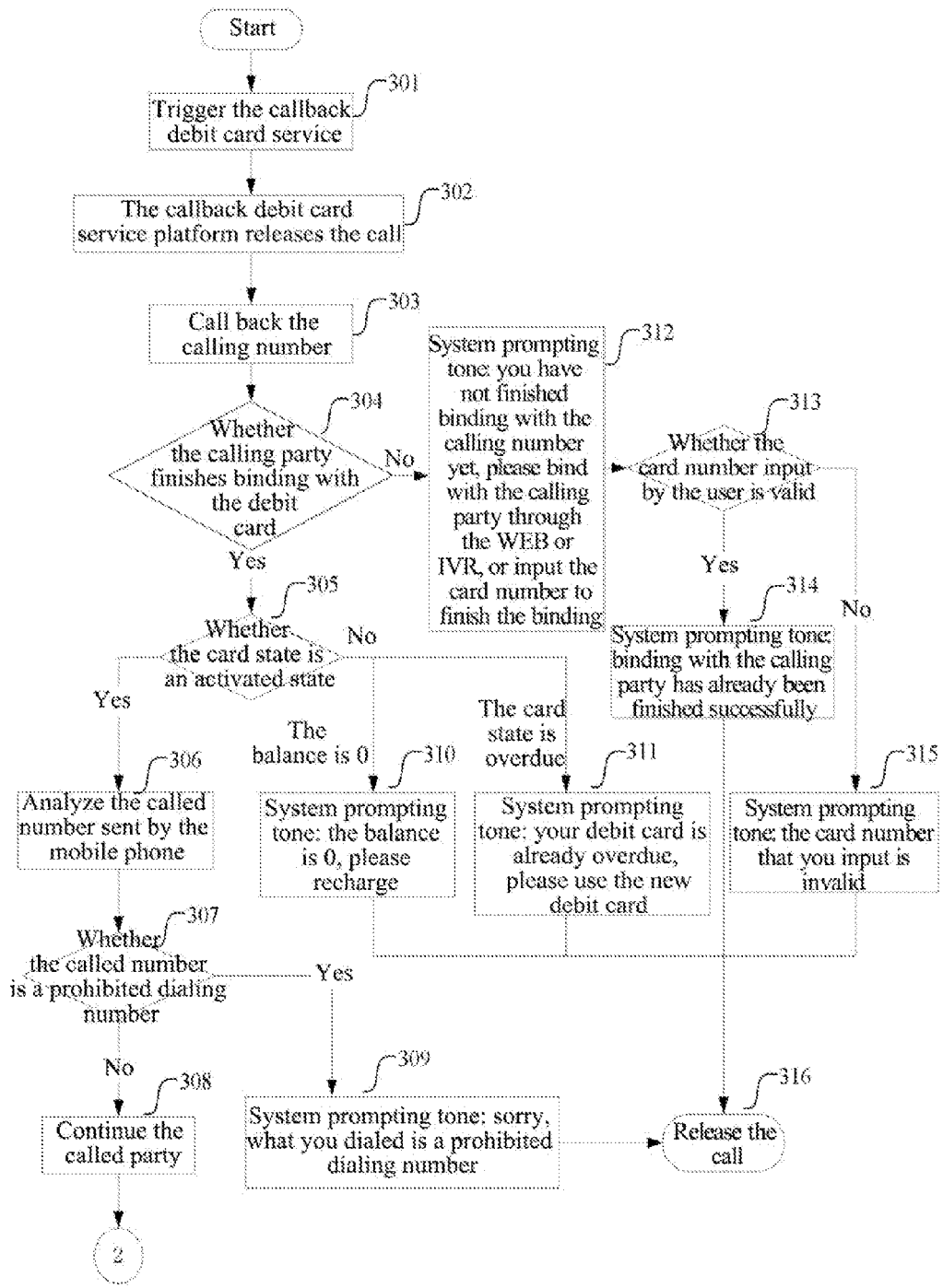
FIG. 3 is a flow chart (1) of debit card service based on callback according to an embodiment of the present invention.
Figure 4:
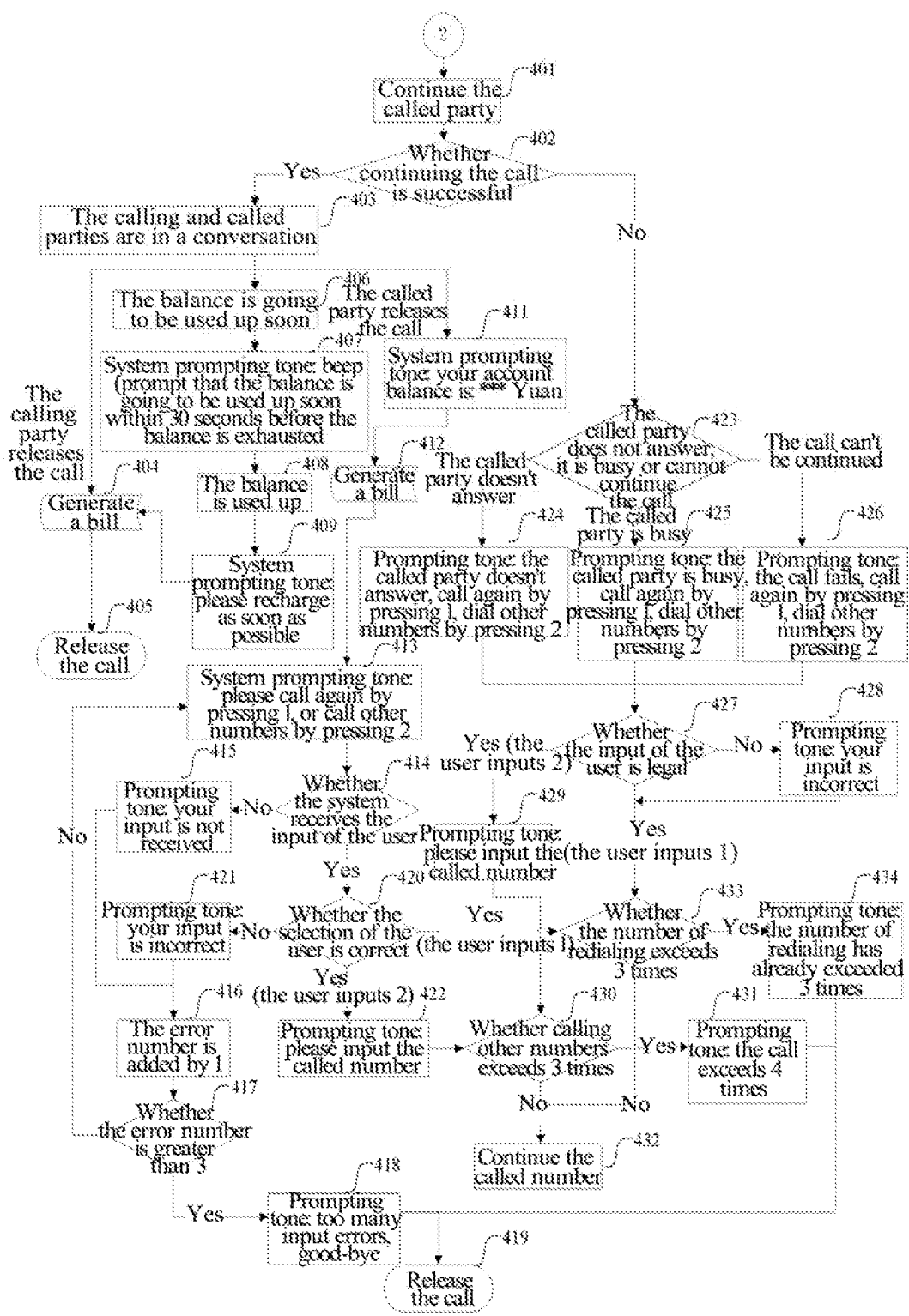
FIG. 4 is a flow chart (2) of debit card service based on callback according to an embodiment in FIG. 3.

Referring to FIG. 3 and FIG. 4, FIG. 3 and FIG. 4 show the procedures of the debit card service based on callback according to the application example of the present invention.

Wherein, FIG. 3 mainly describes that: after the mobile user triggers the debit card service by using the hardware or software mode, the callback debit card service platform (that is, the aforesaid Parlay gateway and APP server) releases the call at first, and then calls back the calling number. After off hook by a user, the service platform judges whether the calling number binds with the debit card; if finished binding and the card state is the activated state, the service platform analyzes the called number sent out by the mobile phone, and if the called number is not in the list of prohibited dialing number, the service platform continues the called number; if finished the binding and the card state is overdue or the balance is 0, the service platform will broadcast the corresponding warning tone for the user. If the calling number does not finished binding with the debit card, the service platform will prompt the user to perform the binding operation. It includes the following steps specifically:

in step 301, the mobile user initiates the call, and triggers the debit card service;

the mobile terminal turning on the automatic dialing function, in the process of the user initiating the call normally, dials the preset access code before the called number automatically, and calls to the callback debit card service platform automatically.

In step 302, the callback debit card service platform releases the call;

after the callback debit card service platform releases the call, in other words this call is not connected, the user will not generate the expense.

In step 303, the callback debit card service platform calls back the calling number;

in step 304, the callback debit card service platform judges whether the calling party finishes binding with the debit card, if finished the binding, step 305 is executed; otherwise step 312 is executed;

in step 305, the callback debit card service platform judges the state of the debit card bound by the mobile user, if being the activated state, step 306 is executed; if being the non-activated state, and the specific condition is that the balance of that debit card is insufficient, then step 310 is executed; if being the non-activated state, and the specific condition is that that debit card is already overdue, then step 311 is executed;

in step 306, the callback debit card service platform analyzes the called number sent out by the mobile phone;

in step 307, the callback debit card service platform judges whether that called number is a prohibited dialing number, if not the prohibited dialing number, then step 308 is executed; if being the prohibited dialing number, step 309 is executed;

in step 308, the callback debit card service platform continues the called party, and the procedure in FIG. 4 is executed subsequently;

in step 309, the warning tone is broadcasted to the mobile user: sorry, what you dialed is a prohibited dialing number, and step 316 is executed;

in step 310, the following warning tone is broadcasted to the mobile user: the balance is 0, please recharge, and step 316 is executed;

in step 311, the following warning tone is broadcasted to the mobile user: your debit card is already overdue, please use the new debit card, and step 316 is executed;

in step 312, the following warning tone is broadcasted to the mobile user: you have not finished binding with the calling number yet, please bind with the calling party through the WEB or IVR, or input the debit card number to finish the binding, and step 313 is executed;

in step 313, the callback debit card service platform judges whether the debit card number input by the user is valid, if being valid, step 314 is executed; if being invalid, then step 315 is executed;

in step 314, the following warning tone is broadcasted to the mobile user: you have already finished binding with the calling party, and step 316 is executed;

in step 315, the following warning tone is broadcasted to the mobile user: the card number that you input is invalid, and step 316 is executed;

in step 316, the callback debit card service platform releases this call.

FIG. 4 mainly describes the service procedure after the service platform continuing the called number; if continuing the called party successfully and the calling party hangs up at first, the service platform will generate the bill, and release the call; if continuing the called party successfully and the called party hangs up at first, then the service platform prompts the user to call again, or input other called numbers. If it is unsuccessful to continue the called number, then the corresponding warning tone is broadcasted for the user according to different situations.

In step 401, the callback debit card service platform continues the called party, and finishes establishing this call;

in step 402, the callback debit card service platform judges whether it is successful to continue the called party; if yes, step 403 is executed; if unsuccessful, step 423 is executed;

in step 403, the calling and called parties make the conversation, and different steps are executed according to different situations of finishing the conversation; if the calling party releases the call, step 404 is executed; if the called party releases the call, step 411 is executed; if the callback debit card service platform finds that the balance is insufficient, step 406 is executed;

in step 404, the callback debit card service platform generates the bill;

in step 405, the callback debit card service platform releases the call, and the procedure ends;

in step 406, the callback debit card service platform judges that the balance will be used up soon;

in step 407, the following warning tone is broadcasted to the mobile user in 30 seconds before the balance is exhausted: beep, in order to warn the user that the balance is going to be used up soon;

if the calling party hangs up within 30 seconds, then it deals with the situation as the calling party releasing the call, step 404 is executed.

In step 408, the balance is used up;

in step 409, the following warning tone is broadcasted to the mobile user: please recharge as soon as possible, and step 404 is executed;

in step 411, the following warning tone is broadcasted to the mobile user: your account balance is: ***Yuan;

in step 412, the callback debit card service platform generates the bill;

in step 413, the following warning tone is broadcasted to the mobile user: please call again by pressing 1, or call other numbers by pressing 2;

in step 414, it is judged whether the input of the user is received; if received, step 420 is executed; if not received yet, then step 415 is executed;

in step 415, the following warning tone is broadcasted to the mobile user: your input is not received;

in step 416, the error number is added by 1;

in step 417, it is judged whether the error number is greater than 3; if yes, step 418 is executed; if not, step 413 is returned;

in step 418, the following warning tone is broadcasted to the mobile user: too many input errors, good-bye, and step 419 is executed;

in step 419, the callback debit card service platform releases the call, and the procedure ends;

in step 420, it is judged whether the selection of the user is correct; if being correct, and what the user inputs is 1, step 433 is executed; if being correct, and what the user input is 2, step 422 is executed; if being incorrect, step 421 is executed;

in step 421, the following warning tone is broadcasted to the mobile user: your input is incorrect, and step 416 is executed;

in step 422, the following warning tone is broadcasted to the mobile user: please input the called number, and after the user inputs, step 430 is executed;

here it can also increase a step of checking whether the called number is a prohibited dialing number.

In step 423, if the called party does not answer, step 424 is executed; if the called party is busy, step 425 is executed; if being unable to continue the call, step 426 is executed;

in step 424, the following warning tone is broadcasted to the mobile user: the called party does not answer, call again by pressing 1, dial other numbers by pressing 2, and step 427 is executed;

in step 425, the following warning tone is broadcasted to the mobile user: the called party is busy, call again by pressing 1, dial other numbers by pressing 2, and step 427 is executed;

in step 426, the following warning tone is broadcasted to the mobile user: the call fails, call again by pressing 1, dial other numbers by pressing 2, and step 427 is executed;

in step 427, the callback debit card service platform judges whether the input of the user is correct; if being correct, and what the user inputs is 1, step 433 is executed; if being correct, and what the user inputs is 2, step 429 is executed; if being incorrect, step 428 is executed;

in step 428, the following warning tone is broadcasted to the mobile user: your input is incorrect, and step 433 is executed;

in step 429, the following warning tone is broadcasted to the mobile user: please input the called number, and after the user inputs, step 430 is executed;

here it can also increase a step of checking whether the called number is a prohibited dialing number.

In step 430, the callback debit card service platform judges whether the number of the user calling other numbers exceeds 3 times; if yes, step 431 is executed, if not, step 432 is executed;

to the limited calling number in the present embodiment is 4 times, while in other embodiments, this number can be changed, or not limited.

In step 431, the following warning tone is broadcasted to the mobile user: the dialing number already exceeds 4 times, and step 419 is executed;

in step 432, the called number is continued, later step 401 is returned, and this procedure is circularly executed.

In step 433, the callback debit card service platform judges whether the rebroadcasting number exceeds 3 times; if yes, step 434 is executed, if not, step 432 is executed;

in step 434, the following warning tone is broadcasted to the mobile user: the rebroadcasting number exceeds 3 times, and step 419 is executed.

The warning tones provided in the two above-mentioned procedures are only examples, not as the limitation to the present invention. Those skilled in the art can modify the warning tone content according to the thought of the present invention. In addition, in application, the steps can be reduced or amalgamated depending upon need, and the limitation of the calling number is not limited to 4 times either.

In sum, the debit card service based on callback provided in the present invention has the following characteristics:

(1), supporting two kinds of callback modes at the same time, one kind is the callback based on the hardware mode, another kind is the callback based on the software mode, and the two kinds of callback modes can use different access code.

(2), a plurality of users can use one debit card at the same time, the users of a plurality of debit cards can use different callback modes, which can be the hardware mode, and also can be the software mode, but can share a debit card together.

(3), it can realize the subsequent call, when the call is performed continuously, it does not need to input the card number and password again.

(4), the telephone binding function, it can bind the card and the telephone to reduce the user operation, and the user does not need to input the card number in the callback service process again.

(5), the recharging function, when the money of the card is insufficient, it can adopt the issued rechargeable card to recharge it and continue to use, thus lengthening the life time of the card.

(6), transferring the balance, when the balance of the card is insufficient to make one phone call, it can select to transfer the balance of that card to other usable card to save the fund of the user.

(7), familiarity number function, when the operator sets that function, the user can select to set the phone number dialed often as the familiarity number, thus enjoying more favorable telephone expense.

(8), the service management mode, it supports the operator service management mode adopting the www terminal. The operator can perform the service management through the www terminal, including the functions, such as, issuing, activation, inquiring and recharging of the debit card, and the traffic statistics of the debit card service, etc.

(9), the user self-service management mode it supports the user self-service management based on the WEB and based on the IVR at the same time.

For the self-service management based on the WEB, the user can perform the functions, such as, logging on the WEB websites, setting the default language, binding the number, modifying the password, inquiring the bill, inquiring the balance, inquiring the period of validity of the debit card, recharging, transferring accounts, etc.

For the self-service management based on the IVR, the user can enter the IVR self-service management procedure by dialing the debit card access code, and perform the functions, such as, setting the default language, binding the number, modifying the password, inquiring the balance, inquiring the period of validity of the debit card, recharging, transferring accounts, etc., through the voice interaction.

(10), the traffic statistics it can count the sum of the total calling number based on the callback mode. Also it can perform the traffic statistics respectively according to the callback of the hardware and the software mode, such as, the total calling number in an appointed time period, total connection number, etc.; and also it can perform the statistics respectively according to the calling party type and the called party type.

(11), charging mode in the callback service, the mobile terminal uses the debit card service as being a called party in fact, so the conversation expense is only recorded in the debit card, and the secondary charging problem does not exist.

It supports the charging of various service types, and can set various charging schemes (charging set menu), and the service user can select the charging scheme (charging set menu) which best fits its own characteristic.

It supports the charging of various calling types, such as, the local call, the domestic long distance call, the IP phone and the international long distance call, etc., in real time.

It really supports the distinguished charging of the local call, the domestic long distance call, the IP Phone and the international long distance call. The domestic, international, Hong Kong, Macao and Taiwan call can flexibly select the charging matrix of one-to-many or many-to-many.

It provides many kinds of discount schemes, which can realize the many kinds of time discount schemes and algorithm combinations and meet various charging demands. The discount can be a discount according to the time period, a discount according to the region and a discount according to the service; each kind of discount can also be divided into a discount according to rate, a discount according to the calling number and a discount according to the total cost, etc.

The above description is only the preferred embodiments of the present invention and is not intended to limit the scope of the present invention. The present invention can have a variety of other embodiments. Those skilled in the art can make the corresponding modifications and variations according to technical scheme and the conception of the present invention without departing from the spirit and essence of the present invention. And all of these modifications or the variations should be embodied in the scope of the appending claims of the present invention.

INDUSTRIAL APPLICABILITY

The debit card service platform of the present invention is especially designed for the mobile user, which can analyze the called number dialed by the user, and finish continuing the called party automatically, and establish the conversation between the calling party and the called party. In addition, since the callback is initiated voluntarily, it can avoid the mobile user to generate the expense, and deducts the telephone expense only from the account number bound by the user in advance.

The mobile phone application program of the present invention makes the user, when using the debit card service, operate more simply and more convenient, and the user experience is better.

What is claimed is:

1. A method for implementing a callback based on debit card service in a mobile device, comprising:
   when a mobile terminal, which is configured with an automatic dialing function unit and a calling number of which is bound with a debit card, calling a called number entered by a user;
   the automatic dialing function unit in the said mobile terminal prefixing a preset callback access code to the called number before dialing so as to trigger the call to a debit card service platform according to the preset callback access code, wherein the debit card service platform is able to obtain the called number called by the mobile terminal; wherein an automatic dialing function of the automatic dialing function unit is activated;
   the said debit card service platform releasing the call and then calling back the said mobile terminal;
   the said debit card service platform continuing the call to the called number according to the obtained called number after the said mobile terminal answers the callback;
   wherein, after the said debit card service platform calls back the mobile terminal, it determines whether a binding between the calling number of the mobile terminal and the debit card has been completed, and if it is completed, it continues the call to the called number; and if the binding is not completed, it prompts the mobile terminal to complete the binding.

2. The method according to claim 1, wherein,
   the said automatic dialing function unit is implemented in a hardware mode, an application program mode or a firmware mode.

3. The method according to claim 2, wherein,
   the callback access code is preset in the said automatic dialing function unit, and the said preset callback access code implemented in the hardware mode, in the application program mode or in the firmware mode are different.

4. The method according to claim 2, wherein,
   the debit card is bound with a plurality of calling numbers corresponding to mobile terminals, and automatic dialing function units in the mobile terminals corresponding to the said calling numbers uses same or different implementation modes.

5. A system for implementing a callback based on debit card service in a mobile device comprising:
   a debit card service platform which is able to obtain a called number called by a mobile terminal, and the mobile terminal containing an automatic dialing function unit, wherein an automatic dialing function of the said automatic dialing function unit is activated and a calling number of the mobile terminal is bound with a debit card, wherein:
   the said mobile terminal containing the automatic dialing function unit is configured in such a way that: the automatic dialing function unit dials a preset callback access code before dialing a called number when the said mobile terminal calls the called number so as to trigger the call to the debit card service platform according to the preset callback access code;

the said debit card service platform is configured in such a way that, upon receiving the call with the preset callback access code, it releases the call, then calls back the said mobile terminal that initializes the call, and then continues the call to the called number according to the obtained called number after the said mobile terminal answers the callback;

wherein, the said debit card service platform is further configured to, after calling back the mobile terminal, determine whether a binding between the calling number of the mobile terminal and the debit card has been completed, and if it is completed, continue the call to the called number; and if the binding is not completed, prompt the mobile terminal to complete the binding.

6. The system according to claim 5, wherein, the automatic dialing function unit is implemented in a hardware mode, an application program mode or a firmware mode.

7. A debit card service platform which is able to obtain a called number called by a mobile terminal for implementing a callback based on debit card service in a mobile device, comprising:

a receiving module, a call releasing module, a callback module, a conversation establishment module, and a binding determination module, wherein:

the said receiving module is configured to receive a call triggered according to a present callback access code prefixing by an automatic dialing function unit contained in the mobile terminal to the called number after the mobile terminal initiates a call to the called number by a user inputting the called number;

the said call releasing module is configured to release the call after the said receiving module receives the call;

the said callback module is configured to call back the mobile terminal after the said call releasing module releases the call;

the said conversation establishment module is configured to continue the call to the called number according to the analyzed obtained called number after the mobile terminal answers the callback; and the said binding determination module is configured to determine whether a binding between a calling number of the mobile terminal and a debit card is completed, and if the binding is completed, then trigger the conversation establishment module to continue the call to the called number; if the binding is not completed, then prompt the mobile terminal to complete the binding.

8. The debit card service platform according to claim 7, further comprising, a bill generation module configured to generate a bill after a conversation between the mobile terminal and the called party ends as to record expenses of the conversation that is then deducted from the debit card.

9. The debit card service platform according to claim 7, wherein, the automatic dialing function unit in the mobile terminal is implemented in a hardware mode, an application program mode or a firmware mode; and the receiving module is further configured to store the callback access code used by the mobile terminal with an automatic dialing function implemented in the hardware mode, the application program mode or the firmware mode, and a call received by the said receiving module comprises a call initiated by the mobile terminal implementing the automatic dialing function in hardware mode, in application program mode or in firmware mode.

10. The debit card service platform according to claim 9, wherein, the bill generation module is further configured to perform traffic statistics for the debit card service implemented in hardware mode, in application program mode or in firmware mode respectively according to difference of the callback access code.

11. The method according to claim 3, wherein, the debit card is bound with a plurality of calling numbers corresponding to mobile terminals, and automatic dialing function units in the mobile terminals corresponding to the said calling numbers uses same or different implementation modes.

* * * * *